No. 720,670. PATENTED FEB. 17, 1903.
A. C. J. CHARLIER.
PROCESS OF MANUFACTURING LEAD PIGMENTS.
APPLICATION FILED APR. 4, 1902.
NO MODEL.

United States Patent Office.

ANDREW CHARLES JOSEPH CHARLIER, OF GLASGOW, SCOTLAND.

PROCESS OF MANUFACTURING LEAD PIGMENTS.

SPECIFICATION forming part of Letters Patent No. 720,670, dated February 17, 1903.

Application filed April 4, 1902. Serial No. 101,369. (No specimens.)

*To all whom it may concern:*

Be it known that I, ANDREW CHARLES JOSEPH CHARLIER, a subject of the King of Great Britain, and a resident of Glasgow, Scotland, have invented certain new and useful Improvements in the Manufacture of Metallic Compounds, of which the following is a full, clear, and exact specification.

This invention, which relates to the manufacture of lead pigments and lead or other metallic compounds, has for its object to lessen the cost of and reduce the time heretofore necessary for the manufacture of such compounds.

The manufacture of lead compounds is carried on under pressure of the necessary gas, and the present invention is designed to improve the conditions under which the chemical reaction takes place and to indicate apparatus suitable for use in such manufacture.

Figure 1:
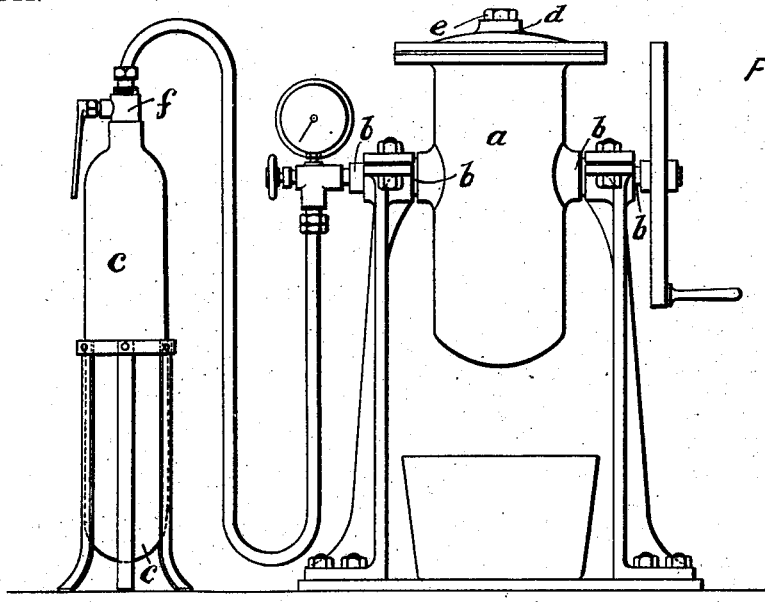
Figure 2:
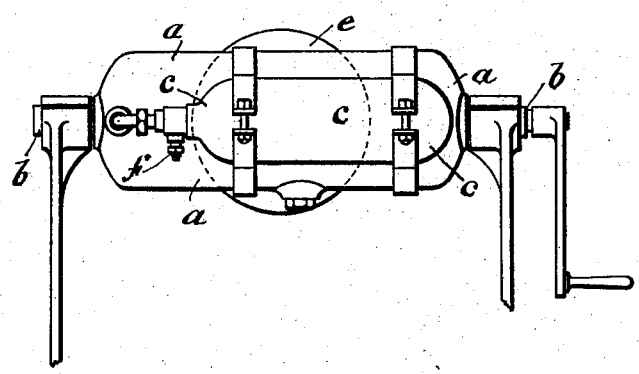

The apparatus in which the chemical reaction is carried out is illustrated under two modifications by Figures 1 and 2 of the accompanying drawings.

In carrying out the present invention in respect to the manufacture of carbonate of lead I take a quantity of oxid of lead or litharge and place it, together with a quantity of water slightly acidified with acetic acid, in a vessel or vat $a$, such as shown at Fig. 1, provided with an inlet $d$, normally closed by a cover $e$, into which vessel carbon dioxid from a cylinder or reservoir $c$ is admitted, by way of a reducing or other valve $f$, to the vessel or vat at a pressure which experiments have shown to be advantageous and important in so far that it hastens the chemical reaction, these experiments having demonstrated that when the gas used is at a pressure of about two hundred pounds to the square inch the chemical reaction is most effective.

The vessel or vat $a$, by which full advantage is taken of the action of the carbon-dioxid gas upon the acidified water, and consequently upon the oxid of lead, and which constitutes an inseparable part of the invention, is preferably mounted upon an axle or trunnions $b$, situated either transversely of the axis of the cylinder, as shown at Fig. 1, or upon said axis, as shown at Fig. 2, so that the said cylinder may be rotated or oscillated by hand or power transversely of its axis, as at Fig. 1, or about its axis, as at Fig. 2, the object being, by means of an action calculated to break up or spray the liquid within the cylinder $a$, to cause a thorough carbonation of the liquid, and consequently a quicker chemical reaction. In twenty minutes a considerable portion of the oxid of lead or litharge will be found to be converted into white lead, and the whole process, which formerly required three months for its completion, can be completed within a few hours, the result being the obtaining of white lead entirely free from oxid of lead or litharge with a pure color and equal in covering power and opacity to the best white lead. The acid mixed with the water in the cylinder $a$ is not employed to dissolve the litharge, but merely acts as a carrier, and by means of the pressure of carbon-dioxid gas it combines with the litharge and forms white lead. Means, such as are shown at Fig. 1, may when a continuous supply of gas is desired be provided by forming one of the trunnions $b$ with a central passage communicating directly or indirectly with the interior of the cylinder or vessel $a$ and connected to the gas-reservoir, whereby a continuous pressure of gas may be obtained and the necessity for breaking the joint between the vessel $a$ and the gas-reservoir $c$ in order to recharge said vessel $a$ being rendered unnecessary, the trunnion admitting of the oscillation or rotation of the cylinder under such connection, or the continuous supply can be obtained; as shown at Fig. 2, by carrying the gas-reservoir $c$ alongside of the vat $a$, so as to be rotated or oscillated therewith, or any other means of providing a continuous supply of gas may be resorted to.

Having now described my invention, what I claim, and desire to secure by Letters Patent, is—

A process for the production of white lead from litharge said process consisting in submitting litharge, in contact with acidified water, to the action of carbon-dioxid gas at a pressure of about two hundred pounds.

In witness whereof I have hereunto set my hand in presence of two witnesses.

ANDREW CHARLES JOSEPH CHARLIER.

Witnesses:
ROBERT BROWN,
JAMES MCCLURE, Jr.